US008486322B2

(12) United States Patent
Nagasawa et al.

(10) Patent No.: US 8,486,322 B2
(45) Date of Patent: *Jul. 16, 2013

(54) GOLF BALL MANUFACTURING METHOD

(75) Inventors: Hiroyuki Nagasawa, Chichibu (JP); Hiroshi Higuchi, Chichibu (JP); Motoki Aoyagi, Chichibu (JP); Daisuke Arai, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 13/106,499

(22) Filed: May 12, 2011

(65) Prior Publication Data
US 2011/0212266 A1  Sep. 1, 2011

Related U.S. Application Data

(62) Division of application No. 11/507,464, filed on Aug. 22, 2006, now Pat. No. 7,964,132.

(51) Int. Cl.
B29C 45/14 (2006.01)

(52) U.S. Cl.
USPC ............ 264/279.1; 264/328.17; 264/345

(58) Field of Classification Search
USPC ............ 264/234, 235, 345, 279.1, 328.17
See application file for complete search history.

(56) References Cited

U.S. PATENT DOCUMENTS

| | | | |
|---|---|---|---|
| 3,395,109 A | 7/1968 | Molitor et al. | |
| 4,248,432 A | 2/1981 | Hewitt et al. | |
| 4,347,338 A | 8/1982 | Torii et al. | |
| 4,442,282 A | 4/1984 | Kolycheck | |
| 5,006,297 A | 4/1991 | Brown et al. | |
| 5,334,673 A | 8/1994 | Wu | |
| 5,733,428 A | 3/1998 | Calabria et al. | |
| 5,888,437 A | 3/1999 | Calabria et al. | |
| 5,897,884 A | 4/1999 | Calabria et al. | |
| 5,929,189 A | 7/1999 | Ichikawa et al. | |
| 5,947,843 A | 9/1999 | Calabria et al. | |
| 6,117,024 A | 9/2000 | Dewanjee | |
| 6,123,628 A | 9/2000 | Ichikawa et al. | |
| 6,190,268 B1 | 2/2001 | Dewanjee | |
| 6,702,695 B1 | 3/2004 | Higuchi et al. | |
| 6,747,100 B2 | 6/2004 | Ichikawa et al. | |
| 6,806,323 B2 | 10/2004 | Ichikawa et al. | |
| 7,622,065 B2 | 11/2009 | Fujisawa et al. | |
| 2004/0239000 A1 | 12/2004 | Murphy et al. | |
| 2005/0079929 A1* | 4/2005 | Tzivanis et al. | ............. 473/370 |
| 2005/0146077 A1 | 7/2005 | Tzivanis et al. | |

FOREIGN PATENT DOCUMENTS

| | | |
|---|---|---|
| JP | 58-2063 B2 | 1/1983 |
| JP | 9-271538 A | 10/1997 |
| JP | 11-178949 A | 7/1999 |
| JP | 2001-054588 A | 2/2001 |
| JP | 2002-336378 A | 11/2002 |
| JP | 2002-336380 A | 11/2002 |
| JP | 2004-000649 A | 1/2004 |
| JP | 2004-209071 A | 7/2004 |
| JP | 2005-518231 A | 6/2005 |
| JP | 2006-042882 A | 2/2006 |
| WO | WO 03/068331 A1 | 8/2003 |

OTHER PUBLICATIONS

JP Office Action issued on Nov. 14, 2012 from the Japanese Patent Office in Japanese Application No. 2007-205093.

* cited by examiner

*Primary Examiner* — James Sanders
(74) *Attorney, Agent, or Firm* — Sughrue Mion, PLLC

(57) ABSTRACT

The invention provides a method of manufacturing golf balls having a core and least one cover layer which involves injecting a molten cover resin material around a core so as to form a cover layer. The cover resin material is a single resin composition made up of (A) a thermoplastic polyurethane, (B) a polyisocyanate compound and (C) a thermoplastic elastomer other than the thermoplastic polyurethane in a weight ratio (A):(B):(C)=100: {2-50}: {0-50}, and is injected with from 10 to 99% of the total number of isocyanate groups in component B remaining in an unreacted state within the cover resin material. The method of the invention provides a high manufacturability and a good amenability to mass production, and the manufactured gold balls thus obtained have a high rebound and excellent scuff resistance.

5 Claims, No Drawings

GOLF BALL MANUFACTURING METHOD

CROSS REFERENCE TO RELATED APPLICATION

This application is a divisional of U.S. application Ser. No. 11/507,464 filed Aug. 22, 2006. The above-noted application is incorporated herein by reference in its entirety.

BACKGROUND OF THE INVENTION

The present invention relates to a golf ball manufacturing method in which a specific thermoplastic polyurethane material is used as the cover material and injection-molded around a core. More specifically, the invention relates to a manufacturing method which is capable of obtaining a golf ball having a high rebound, excellent spin characteristics and excellent scuff resistance, and having also excellent flow properties of a cover material in injection-molding and manufacturability.

The use of polyurethane materials as golf ball cover materials has received attention in recent years. Polyurethane materials are broadly divided, based on the process used to make molded parts therefrom, into thermoset polyurethane materials and thermoplastic polyurethane materials. Molded parts made of thermoset polyurethane materials can be obtained by mixing under applied heat a urethane prepolymer having isocyanate end groups with a liquid starting material such as a polyol or a polyamine as the curing agent, then pouring the mixture directly into a mold and heating to effect a urethane curing reaction.

Numerous golf balls which use such a thermoset polyurethane material have been disclosed in the prior art (e.g., Patent Reference 1: U.S. Pat. No. 5,334,673; Patent Reference 2: U.S. Pat. No. 6,117,024; and Patent Reference 3: U.S. Pat. No. 6,190,268). Methods of molding thermoset polyurethane materials are described in, for example, Patent Reference 4: U.S. Pat. No. 5,006,297; Patent Reference 5: U.S. Pat. No. 5,733,428; Patent Reference 6: U.S. Pat. No. 5,888,437; Patent Reference 7: U.S. Pat. No. 5,897,884; and Patent Reference 8: U.S. Pat. No. 5,947,843.

Because moldings made of thermoset polyurethane materials lack plasticity when heated, the starting materials and molded parts cannot be recycled. Moreover, given the length of the heating and curing step and of the cooling step and given the great difficulty of controlling the molding time owing to the high reactivity of the starting materials under heating and their instability, the manufacturability of molded parts made of thermoset polyurethane materials, when used as specialty moldings such as golf ball covers (moldings which encase a core material), is regarded as inefficient.

By contrast, moldings made of thermoplastic polyurethane materials are not obtained by directly reacting the starting materials. Instead, a linear polyurethane material synthesized using starting materials and a production method which differ somewhat from those for the thermoset polyurethane materials described above is employed in the molding operation. Such a polyurethane material is thermoplastic, and thermoplasticized polyurethane materials have the quality of solidifying when cooled. Such polyurethane materials can thus be molded using an injection molding machine. Injection molding a thermoplastic polyurethane material requires a much shorter molding time than the molding time for a thermoset polyurethane material and moreover is suitable for precision molding, making it ideal as a process for molding golf ball covers. In addition, thermoplastic polyurethane materials are recyclable, and are friendly to the global environment. Golf balls made using thermoplastic polyurethane materials are disclosed in, for example, Patent Reference 9: U.S. Pat. No. 3,395,109; Patent Reference 10: U.S. Pat. No. 4,248,432; and Patent Reference 11: U.S. Pat. No. 4,442,282.

However, golf ball covers made with conventional thermoplastic polyurethane materials have been unable to satisfy all of the following properties in a golf ball: feel on impact, controllability, rebound, and scuff resistance when hit with an iron.

To address this need, Patent Reference 12: JP-A 9-271538 discloses a golf ball cover made using a thermoplastic polyurethane material having a high resilience. Yet, even this golf ball cover falls short in terms of its scuff resistance when hit with an iron.

Patent Reference 13: JP-A 11-178949 describes a golf ball cover which has a relatively good scuff resistance when hit with an iron and is composed primarily of the reaction product of a thermoplastic polyurethane material with an isocyanate compound. In this cover, an isocyanate compound such as a block diisocyanate or an isocyanate dimer is added as an additive to the thermoplastic polyurethane material. Addition is carried out during melt mixing under applied heat using an extruder or during injection molding, with the reaction being effected during molding.

However, in the molding of a cover according to JP-A 11-178949 above, the isocyanate compound is hard to handle because it loses its activity in the presence of moisture, thus making it difficult to obtain a stable reaction product. In the case of blocked isocyanates, which are highly resistant to moisture absorption, the blocking agent that dissociates under heating has a strong odor, making it unsuitable for use in molding covers. Moreover, when the isocyanate compound is in the form of a powder or a solution, it is difficult to control the amount of addition to the thermoplastic polyurethane material, making control of the golf ball cover properties a challenge. Furthermore, owing to melting point and melt viscosity differences between the thermoplastic polyurethane material and the isocyanate compound, slippage arises within the molding machine, which sometimes makes thorough kneading impossible to achieve. In this prior art, for the reasons given above, control of the effects of moisture within the cover material and of the amount of additive included therein has been inadequate, making it impossible to achieve golf ball covers which are fully satisfactory in terms of their scuff resistance-improving effects.

The preferred thermoplastic polyurethane material described in JP-A 11-178949 is based on an aliphatic isocyanate. However, this thermoplastic polyurethane material has a very high reactivity with isocyanate, making the reaction difficult to control. As a result, one problem is that gelation tends to arise before the mixture is used in injection molding, making it impossible to ensure sufficient plasticity. Another problem is that gelation sometimes occurs during the molding operation. Yet another problem is that the resin to be recycled sometimes gels, as a result of which it cannot be reclaimed. These problems have made it difficult to put the above technology to practical use.

Patent Reference 14: JP-B 58-2063 (U.S. Pat. No. 4,347,338) describes a method of manufacturing thermoset polyurethane molded parts which involves intimately mixing a compound having two or more isocyanate groups with a thermoplastic resin which does not react with isocyanate groups, blending the resulting mixture with a thermoplastic polyurethane material, then furnishing the blend to a molding machine and molding. However, the objects of this art are simply to improve the solvent resistance and the resistance to continuous and repeated friction; the published specification makes no mention of the use of this molding material as a golf ball cover material. Accordingly, there continues to exist a desire for a golf ball cover material which can satisfy a number of properties required of golf balls; i.e., rebound, distance, spin characteristics, controllability, feel on impact, scuff resistance, cut resistance, and discoloration resistance.

Patent Reference 15: JP-A 2002-336378 discloses a golf ball which uses a cover material composed of a thermoplastic polyurethane material and an isocyanate mixture. The cover material is a thermoplastic polyurethane material which is recyclable, has a high rebound, and has an excellent scuff resistance. Such a cover material has both a good thermoplastic polyurethane manufacturability and exhibits physical properties comparable with those of thermoset polyurethanes. At the same time, the plasticizing effect of the isocyanate compound enhances the flow properties of the thermoplastic polyurethane material, thus enabling the manufacturability to be improved as well. However, this excellent art also has a number of drawbacks, including the generation of scorched material when the isocyanate mixture is charged directly into the molding machine, and variability in the mixing proportions due to the use of a dry blending process, which results in a poor uniformity and leads to poor molding stability. In addition, because the relative proportions within the isocyanate mixture of the isocyanate compound and the thermoplastic resin which substantially does not react with isocyanate are already decided, it has been difficult to freely select the amounts and types of the isocyanate compound and the thermoplastic resin that one wishes to add.

In addition, Patent Reference 16: JP-A 2002-336380 describes a golf ball wherein a material obtained by blending a thermoplastic polyurethane material that contains as the polymeric polyol a polyether polyol having an average molecular weight of at least 1500 and that has a rebound resilience of at least 40% with a specific isocyanate mixture is used as the cover material. However, this cover material has the same drawbacks as those associated with the art disclosed in aforementioned Patent Reference 15; namely, the generation of scorched material when the cover material is charged into the molding machine, poor molding stability, and limitations on selecting the amounts and types of isocyanate compound to be added.

SUMMARY OF THE INVENTION

It is thus an object of the present invention to provide a method of manufacturing golf balls having a high rebound and an excellent scuff resistance, and having also excellent flow properties of a cover material in injection-molding and an excellent manufacturability.

As a result of extensive investigations, the inventors have discovered that when an injection molding process is used to manufacture golf balls having one or more cover layers encasing a core, by using a cover resin material composed primarily of a resin mixture obtained by the admixture of (A) a thermoplastic polyurethane, (B) a polyisocyanate compound and (C) a thermoplastic elastomer other than the thermoplastic polyurethane in a weight ratio (A):(B):(C)=100:{2-50}:{0-50} and injection-molding the cover resin material with from 10 to 99% of the total number of isocyanate groups in component B remaining in an unreacted state, the cover resin material has high flow properties, problems such as resin scorching do not arise when the isocyanate mixture is directly charged into the molding machine, and the molding environment is stable. Moreover, the inventors have also found that golf balls having a molded cover (cover layer) obtained by the above injection molding process are endowed with a high rebound and an excellent scuff resistance.

Accordingly, the invention provides the following golf balls.

[1] A method of manufacturing golf balls having a core and at least one cover layer, the method being comprised of injecting a molten cover resin material around a core so as to form a cover layer, wherein the cover resin material is a single resin composition comprising (A) a thermoplastic polyurethane, (B) a polyisocyanate compound and (C) a thermoplastic elastomer other than the thermoplastic polyurethane in a weight ratio (A):(B):(C)=100:{2-50}:{0-50} and is injected with from 10 to 99% of the total number of isocyanate groups in component B remaining in an unreacted state within the cover resin material.

[2] The golf ball manufacturing method of [1] wherein, when the cover resin material is injected with an injection molding machine, the unreacted state of the isocyanate groups in component B is maintained from a cover resin material feeder and throughout the interior of the injection molding machine by filling the molding machine with an inert gas or low dew-point air.

[3] The golf ball manufacturing method of [1] wherein the components of the cover resin material are present in a weight ratio (A):(B):(C)=100:{2-30}:{8-50}.

[4] The golf ball manufacturing method of [1], wherein the cover resin material has a melt mass flow rate (MFR) at 210° C. of at least 5 g/10 min.

[5] The golf ball manufacturing method of [1], wherein the cover resin material includes a recycled resin material.

[6] A method of manufacturing golf balls which is characterized in that a golf ball having a cover layer formed thereon is post-treated for a specific length of time in up to a 150° C. temperature environment and/or a high-humidity environment.

[7] The golf ball manufacturing method of [6], wherein the treatment environment is selected from one of (i) to (iv) below:
(i) under a heat source of up to 120° C.,
(ii) in a constant-temperature, constant-humidity chamber at a relative humidity of at least 50% but not more than 80%,
(iii) in warm water at a temperature of not above 80° C.,
(iv) in cold water at a temperature of not above 25° C.

[8] The golf ball manufacturing method of [7], wherein the treatment time does not exceed 5 hours.

DETAILED DESCRIPTION OF THE INVENTION

The invention is described more fully below.

The golf ball manufacturing method of the invention obtains golf balls having a core and one or more cover layer by injecting a molten cover resin material around a core so as to mold the cover layer. The method of the invention is characterized by the use, as the cover resin material, of a single resin composition containing (A) a thermoplastic polyurethane, (B) a polyisocyanate compound and (C) a thermoplastic elastomer other than the thermoplastic polyurethane in a weight ratio (A):(B):(C)=100:{2-50}:{0-50}.

As noted above, the cover resin material is composed primarily of a thermoplastic polyurethane, and includes: (A) a thermoplastic polyurethane, (B) a polyisocyanate compound and (C) a thermoplastic elastomer other than the thermoplastic polyurethane.

The total weight of above components A and B combined, while not subject to any particular limitation, is preferably at least 60%, and more preferably at least 70%, of the overall weight of the cover layer. Components A, B and C used in the invention are each described in detail below.

The thermoplastic polyurethane serving as component A has a structure which includes soft segments made of a polymeric polyol that is a long-chain polyol (polymeric glycol), and hard segments made of a chain extender and a polyisocyanate compound. Here, the long-chain polyol used as a starting material is not subject to any particular limitation, and may be any that is used in the prior art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of a cyclic ether. The polyether polyol may be used singly or as a combination of two or more thereof. Of these, poly(tetramethylene glycol) and/or poly(methyltetramethylene glycol) are preferred.

It is preferable for these long-chain polyols to have a number-average molecular weight in a range of 1,500 to 5,000. By using a long-chain polyol having a number-average molecular weight within this range, golf balls made of a thermoplastic polyurethane composition having excellent properties such as resilience and manufacturability can be reliably obtained. The number-average molecular weight of the long-chain polyol is more preferably in a range of 1,700 to 4,000, and even more preferably in a range of 1,900 to 3,000.

As used herein, "number-average molecular weight of the long-chain polyol" refers to the number-average molecular weight computed based on the hydroxyl number measured in accordance with JIS K-1557.

Suitable chain extenders include those used in the prior art relating to thermoplastic polyurethanes. For example, low-molecular-weight compounds which have a molecular weight of 400 or less and bear on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these chain extenders, aliphatic diols having 2 to 12 carbons are preferred, and 1,4-butylene glycol is especially preferred.

The polyisocyanate compound is not subject to any particular limitation; preferred use may be made of one that is used in the prior art relating to thermoplastic polyurethanes. Specific examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as above component A to be a thermoplastic polyurethane synthesized using a polyether polyol as the long-chain polyol, using an aliphatic diol as the chain extender, and using an aromatic diisocyanate as the polyisocyanate compound. It is desirable, though not essential, for the polyether polyol to be a polytetramethylene glycol having a number-average molecular weight of at least 1,900, for the chain extender to be 1,4-butylene glycol, and for the aromatic diisocyanate to be 4,4'-diphenylmethane diisocyanate.

The mixing ratio of activated hydrogen atoms to isocyanate groups in the above thermoplastic polyurethane-forming reaction can be controlled within a desirable range so as to make it possible to obtain a golf ball having various improved properties, such as rebound, spin characteristics, scuff resistance and manufacturability. Specifically, in preparing a thermoplastic polyurethane by reacting the above long-chain polyol, polyisocyanate compound and chain extender, it is desirable to use the respective components in proportions such that the amount of isocyanate groups on the polyisocyanate compound per mole of active hydrogen atoms on the long-chain polyol and the chain extender is from 0.95 to 1.05 moles.

No particular limitation is imposed on the method for preparing the thermoplastic polyurethane used as component A. Production may be carried out by either a prepolymer process or a one-shot process in which the long-chain polyol, chain extender and polyisocyanate compound are used and a known urethane-forming reaction is effected. Of these, a process in which melt polymerization is carried out in a substantially solvent-free state is preferred. Production by continuous melt polymerization using a multiple screw extruder is especially preferred.

Illustrative examples of the thermoplastic polyurethane serving as component A include commercial products such as Pandex T8295, Pandex T8290, Pandex T8260, Pandex T8295 and Pandex T8290 (all available from DIC Bayer Polymer, Ltd.).

Next, concerning the polyisocyanate compound used as component B, it is critical that, in at least some of the polyisocyanate compound in the single resin composition, all the isocyanate groups on the molecule remain in an unreacted state. That is, polyisocyanate compound in which all the isocyanate groups on the molecule are in a completely free state must be present within the single resin composition, and such a polyisocyanate compound may be present together with polyisocyanate compound in which some of the isocyanate groups on the molecule are in a free state.

Various types of isocyanates may be employed without particular limitation as this polyisocyanate compound. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, the use of 4,4'-diphenylmethane diisocyanate, dicyclohexylmethane diisocyanate and isophorone diisocyanate is preferable in terms of the balance between the influence on processability of such effects as the rise in viscosity that accompanies the reaction with the thermoplastic polyurethane serving as component A and the physical properties of the resulting golf ball cover material.

Component C, which is a thermoplastic elastomer other than the above thermoplastic polyurethane, can be effectively used as an ingredient of the cover material in the present invention to further enhance the fluidity of the cover resin material and to elevate the various properties required of a golf ball cover material, such as resilience and scuff resistance. This thermoplastic elastomer is exemplified by one or more thermoplastic elastomer selected from the group consisting of polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of a polyester elastomer, a polyamide elastomer or a polyacetal is especially preferred for such reasons as enhancing the resilience and scuff resistance while retaining a good manufacturability.

In the practice of the invention, it is critical for the weight ratio (A):(B):(C) of the respective components to be 100:{2-50}:{0-50}, and preferably 100:{2-30}:{8-50}. By suitably setting the proportions of components A to C within this range, the fluidity of the cover resin material can be increased and the manufacturability improved, in addition to which the properties of the cover resin material can be further enhanced and the resilience and scuff resistance increased.

In the practice of the invention, the resin composition is prepared by mixing component A with component B, and additionally mixing also component C. It is critical to select the mixing conditions such that some or all of the isocyanate groups in component B remain in an unreacted state. For example, a measure such as the mixture of the components in an inert gas (e.g., nitrogen) or in a vacuum state must be furnished. The resin composition is then injection-molded around a core which has been placed in a mold. To smoothly and easily handle the resin composition, it is preferable for it to be formed into pellets having a length of 1 to 10 mm and a diameter of 0.5 to 5 mm. Isocyanate groups in an unreacted state remain in these resin pellets; as the resin composition is being injection-molded around the core, or due to post-treatment such as annealing, the unreacted isocyanate groups react with component A or component C to form a crosslinked material. Pelletization of the above-described resin composition is not subject to any particular limitation. For example, pelletization may be carried out using a twin-screw extruder.

In addition to above components A to C, various additives may be optionally included in the above cover resin material. Additives that may be suitably used include pigments, dispersants, antioxidants, light stabilizers, ultraviolet absorbers and parting agents.

The melt mass flow rate (MFR) at 210° C. of the resin composition is not subject to any particular limitation. However, to increase the flow properties and manufacturability, the MFR is preferably at least 5 g/10 min, and more preferably at least 6 g/10 min. Too low a melt mass flow rate reduces the fluidity, which may cause eccentricity during injection molding and may also lower the degree of freedom in the moldable cover thickness. The measured value of the melt mass flow rate is obtained in accordance with JIS-K7210 (1999 edition).

The cover resin material is preferably used in a form obtained by using any of various known mixing apparatuses, such as a twin-screw extruder, to pelletize a resin composition prepared by the admixture of above components A to C and any additives. In the practice of the invention, to fully achieve the objects of the invention, advantageous use can be made of a procedure that involves, either during or following mixture of the components A to C and optional additives using any of the various known mixing apparatuses, cooling in an environment isolated from moisture and pelletization so as to form pellets in an incompletely reacted state.

As noted above, the invention involves injection molding the cover resin material around the core. The injection molding machine used for this purpose is generally a known injection molding machine such as is typically used for molding golf balls. The molding temperature varies according to such factors as the type of thermoplastic polyurethane, but is typically in a range of 150 to 250° C.

In the practice of the invention, golf ball production is carried out in a state where active isocyanate groups remain present within the cover resin material during injection molding. That is, the manufacturing method of the invention eliminates, to the extent possible, factors which render the isocyanate groups within component B inactive, the aim being to manifest, after injection molding, a crosslinking effect sufficient for attaining the various properties required of the golf ball. Deactivation of these isocyanate groups is undesirable for the golf ball manufacturing method because it has an adverse influence on the properties of the golf ball, in addition to which it may serve as a factor rendering the manufacturability unstable due to unwanted effects such as fluctuations in the injection pressure during injection molding.

To prevent deactivation of the isocyanate groups, it is desirable to fill the injection molding machine, from the cover resin material feed area and throughout the interior of the injection molding machine via resin paths, with an inert gas such as nitrogen, or with a low dew-point dry air, as the medium for transporting the resin. By using this means, the moisture which causes deactivation of the isocyanate groups is removed and the isocyanate groups are maintained in an unreacted state; that is, the reaction of the isocyanate groups does not proceed and deactivation of the isocyanate groups can be prevented.

In addition, there is a risk of moisture present in trace amounts reacting with isocyanate groups to generate gaseous carbon dioxide or of the polyisocyanate compound vaporizing under heating. To prevent such situations from arising, a vacuum exhaust system may be installed within the mold to be used.

To prevent deactivation of the above isocyanate groups, injection molding may be carried out by vacuum treatment or the like in a low-humidity atmosphere. By carrying out injection molding in such a low-humidity environment, reaction by the isocyanate groups before the resin has been charged into the mold interior is kept from proceeding. As a result, polyisocyanate in which the isocyanate groups are present in a free state is included to some degree in the resin molded part, thus making it possible to increase the golf ball manufacturability and enhance various properties of the manufactured ball, such as the rebound and scuff resistance.

Techniques that could be used to confirm the presence of polyisocyanate compound in an unreacted state within the cover resin material include those which involve extraction with a suitable solvent that selectively dissolves out only the polyisocyanate compound. An example of a simple and convenient method is one in which confirmation is carried out by simultaneous thermogravimetric and differential thermal analysis (TG-DTA) measurement in an inert atmosphere. For example, when the resin composition (cover material) used in the invention is heated in a nitrogen atmosphere at a temperature ramp-up rate of 10° C./min, a gradual drop in the weight of diphenylmethane diisocyanate can be observed from about 150° C. On the other hand, in a resin sample in which the reaction between the thermoplastic polyurethane material and the isocyanate mixture has been carried out to completion, a weight drop from about 150° C. is not observed, but a weight drop from about 230 to 240° C. can be observed.

It is critical that from 10 to 99%, preferably from 50 to 99%, and more preferably from 70 to 99%, of the total number of isocyanate groups in above component B be active (unreacted) isocyanate groups.

After the cover resin material has been injection-molded, the properties as a golf ball cover can be further improved by carrying out post-treatment on the outside surface of the molded cover layer so as to induce the crosslinking reaction to proceed further.

The above-mentioned crosslinking reaction conceivably involves reaction of the remaining isocyanate groups with remaining OH groups in the thermoplastic polyurethane composition to form new urethane linkages, or an addition reaction by remaining isocyanate groups with urethane groups on the thermoplastic polyurethane to form allophanate linkages. Particularly under conditions such as high humidity or in cold or warm water, there is a possibility for the formation of urea linkages or biuret linkages. Hence, such conditions are desirable for improving the scuff resistance.

The heat treatment conditions are not subject to any particular limitation, although temperature treatment can be carried out at preferably 150° C. or below, more preferably 120° C. or below, and most preferably 80° C. or below. The crosslinking efficiency can be increased by heat treatment in this way. Here, the higher the temperature at which heat treatment is carried out, the shorter the time in which the crosslinking reaction can be brought to completion, although excessive heat treatment is undesirable because it may promote deterioration of the cover layer. With the cover resin material used in the present invention, because the crosslinking reaction proceeds in the presence of moisture and there is a possibility of obtaining effective crosslinkages, an elevated temperature is not always necessary.

In cases where the manufactured golf ball is constructed of a core, an intermediate layer encasing the core and a cover encasing the intermediate layer, and the intermediate layer is made of an ionomer resin, if the heat treatment conditions are set at too high a temperature, the temperature may exceed the cluster melting point Ti of the ionomer resin, as a result of which the rebound of the golf ball may decrease. Also, exceeding the melting point Tm of the ionomer resin may result in deformation of the intermediate layer. Hence, it is desirable to carry out treatment at a lower temperature than the cluster melting point (Ti).

No particular limitation is imposed on the heat treatment method. For example, heat treatment may be carried out in an oven, or by installing a heat source place within the injection-molding operation and having the workpieces pass over that place on the production line. Treatment in the presence of moisture can be carried out by providing a constant-temperature, constant-humidity chamber or the like having a temperature of up to 80° C. and a relative humidity of at least 50% or installing a steam-generating place on the production line, and having the workpieces pass over that place on the line. Alternatively, a cold water tank at a temperature of up to 25° C. or a warm water tank at a temperature of up to 80° C. may be installed on the production line, and the workpieces subjected to immersion treatment therein. The heat treatment time correlates with the treatment temperature and thus cannot be strictly specified, although it should be set within a range that elicits a heat treatment effect. To achieve an acceptable treatment effect, the heat treatment time is preferably at least 30 minutes, more preferably at least 1 hour, and even more preferably at least 2 hours. More than the required heat treatment is undesirable. The heat treatment time is preferably not more than 15 hours, more preferably not more than 8 hours, and even more preferably not more than 5 hours, but is not limited within these time ranges. Depending on the presence of moisture and the treatment temperature, as well as the balance with the treatment time, there are cases in which an adverse influence is exerted on the resilience and other resin properties of the molded cover. Hence, it is necessary to suitably select optimal heat treatment conditions in order to reliably achieve the desired properties.

In the manufacturing method of the invention, the runners that form during injection molding can be milled and reused. Here, "runners" refers to excess resin that has solidified in the mold channels for uniformly feeding molten resin during injection molding. In the production of molded articles made of thermoplastic resin, these runners are generally pulverized, mixed with the resin and reused. In working the invention, when recycled resin material is included in the resin to be injection molded, crosslinking reactions proceed in the runner resin and the like as time elapses after molding, causing the viscosity to rise. Hence, it is desirable to add such runner resin and the like prior to reaction completion. Moreover, during a re-pelletizing operation involving the re-use of milled runners as recyclable resin material, it is desirable to provide a measure for preventing the deactivation of isocyanate groups like that described above.

At least one of the one or more cover layers in the golf ball of the invention is made of the above-described thermoplastic polyurethane composition. The cover layer formed of the above thermoplastic polyurethane composition has a surface hardness, expressed as the durometer D hardness, of generally 30 to 90, preferably 35 to 85, more preferably 40 to 80, and even more preferably 45 to 75. If the surface hardness of the cover layer is too low, the spin rate when the ball is hit with a driver may increase, possibly shortening the distance traveled by the ball. On the other hand, if the surface hardness of the cover layer is too high, the feel of the ball on impact may worsen and the urethane material may have a poor resilience and durability.

"Durometer D hardness" refers herein to the hardness measured with a type D durometer in accordance with JIS K7215.

The above-described cover layer has a rebound resilience of generally at least 35%, preferably at least 40%, more preferably at least 45%, and even more preferably at least 47%. Because a thermoplastic polyurethane does not inherently have that good a resilience, strict selection of the rebound resilience is preferable. If the rebound resilience of the cover layer is too low, the distance traveled by the golf ball may dramatically decrease. On the other hand, if the rebound resilience of the cover layer is too high, the initial velocity on shots of under 100 yards requiring control and on putts may be too high and the feel of the ball when played may not agree with the golfer. "Rebound resilience" refers herein to the rebound resilience obtained in accordance with JIS K7311.

The core used in the inventive manufacturing method is not subject to any particular limitation. For example, various cores that may be used include solid cores for two-pieces balls, solid cores having a plurality of vulcanized rubber layers, solid cores having a plurality of resin layers, and thread-wound cores having a rubber thread layer. No particular limitation is imposed on the diameter, weight, hardness, constituent materials and other characteristics of the core.

Moreover, in the invention manufacturing method, in cases where the golf ball of the invention has a construction that includes an intermediate layer, no particular limitation is imposed on the hardness, constituent materials, thickness and other characteristics of the intermediate layer. If necessary, a primer layer may be provided to improve adhesion between the intermediate layer and the cover.

It is preferable for the cover layer to have a thickness within a range of 0.1 to 5.0 mm. The cover layer is not limited to a single layer, and may be formed so as to have a multilayer construction of two or more layers. If the cover is formed with a multilayer construction, the overall thickness of the cover may be set within the foregoing range.

Golf balls obtained according to the manufacturing method of the invention are preferably formed to a diameter and weight in accordance with the Rules of Golf, and are generally formed to a diameter of not less than 42.67 mm and a weight of not more than 45.93 g. The diameter is preferably from 42.67 to 42.9 mm. It is suitable for deflection by the ball when compressed under a load of 980 N (100 kg) to be generally from 2.0 to 4.0 mm, and especially from 2.2 to 3.8 mm.

As explained above, in the golf ball manufacturing method of the invention, the cover resin material used has high flow properties, increasing the golf ball manufacturability. Golf balls thus manufactured have a high rebound and excellent spin characteristics and scuff resistance.

EXAMPLES

The following Examples of the invention and Comparative Examples are provided by way of illustration and not by way of limitation.

Examples 1 to 5, and Comparative Examples 1 to 3

Core Formulation:

| | |
|---|---|
| Polybutadiene rubber | 100 parts by weight |
| Zinc diacrylate | 24.5 parts by weight |
| Zinc oxide | 12 parts by weight |
| Dicumyl peroxide | 1 part by weight |
| Zinc pentachlorothiophenol | 1 part by weight |

The core material of the above formulation was kneaded, following which it was molded and vulcanized at 155° C. for 20 minutes, thereby obtaining a 38.5 mm diameter solid core for a two-piece solid golf ball. The polybutadiene rubber used was BR01 produced by JSR Corporation. The resulting core had a specific gravity of 1.17 g/cm³, a deflection of 3.4 mm when compressed under a load of 980 N (100 kg), and an initial velocity, measured in accordance with the measurement method of the USGA (R&A), of 78.1 m/s.

In Examples 1 to 4 of the invention, the starting materials shown in Table 1 (units: parts by weight) were worked in a twin-screw extruder and under a nitrogen gas atmosphere, thereby giving resin compositions in which there remained unreacted isocyanate groups. These resin compositions were in the form of pellets having a length of 3 mm and a diameter of 1 to 2 mm.

The solid core was placed within an injection-molding mold and the cover material was injection-molded around the core, thereby giving two-piece golf balls having a 2.1 mm thick cover. Following injection-molding of the cover material, post-treatment was administered under the conditions shown in the table. The resulting golf ball was held at room temperature for one week, following which the ball properties were measured.

Samples for measuring the physical properties of the cover were prepared by injection-molding a 2 mm thick sheet, annealing the molded sheet for 8 hours at 100° C., then holding the annealed sheet at room temperature for one week. The results are shown in Table 1.

In Comparative Example 1, the solid core was placed within an injection-molding mold and a dry blend of thermoplastic polyurethane pellets with isocyanate mixture pellets was injection-molded around the core, thereby giving two-piece golf balls having a 2.1 mm thick cover. In Comparative Example 2, only pellets composed entirely of thermoplastic polyurethane were injection-molded. Subsequent treatment was carried out in the same way as described above for the examples of the invention.

TABLE 1

| | | Example | | | | |
|---|---|---|---|---|---|---|
| | | 1 | 2 | 3 | 4 | 5 |
| Thermoplastic polyurethane (pbw) | Polyurethane 1 | 100 | | | | |
| | Polyurethane 2 | | 100 | 100 | 100 | 100 |
| Polyisocyanate compound (pbw) | | 9 | 9 | 9 | 9 | 9 |
| Thermoplastic elastomer (pbw) | | 15 | 15 | 15 | 15 | 15 |
| Titanium oxide (pbw) | | 3.5 | 3.5 | 3.5 | 3.5 | 3.5 |
| Ultramarine blue (pbw) | | 0.4 | 0.4 | 0.4 | 0.4 | 0.4 |
| Polyethylene wax (pbw) | | 1.5 | 1.5 | 1.5 | 1.5 | 1.5 |
| Montan wax (pbw) | | 0.8 | 0.8 | 0.8 | 0.8 | 0.8 |
| MFR (at 210° C.) | | 7.8 | 8.0 | 8.0 | 8.0 | 8.0 |
| Cover properties | Surface hardness (D hardness) | 59 | 60 | 60 | 60 | 60 |
| | Rebound resilience (%) | 53 | 52 | 52 | 52 | 52 |
| Post-treatment | In cold water (2 hours) | yes | | | | |
| | In cold water (18 hours) | | yes | | | |
| | 50° C. warm water (2 hours) | | | yes | | |
| | 50° C. oven (2 hours) | | | | yes | |
| | 50° C. oven (18 hours) | | | | | yes |
| Ball properties | Diameter (mm) | 42.7 | 42.7 | 42.7 | 42.7 | 42.7 |
| | Weight (g) | 45.6 | 45.6 | 45.6 | 45.6 | 45.6 |
| | Deflection (mm) | 2.3 | 2.3 | 2.3 | 2.3 | 2.3 |
| | Initial velocity (m/s) | 77.1 | 77.0 | 77.0 | 77.0 | 77.0 |
| | Scuff resistance 23° C. | 5 | 5 | 5 | 5 | 5 |
| | 13° C. | 5 | 5 | 5 | 5 | 5 |
| | 0° C. | 4 | 4.5 | 4.5 | 4.5 | 4.5 |
| Manufacturability | | good | good | good | good | good |

TABLE 2

| | | Comparative Example | | |
|---|---|---|---|---|
| | | 1 | 2 | 3 |
| Thermoplastic polyurethane (pbw) | Polyurethane 2 | 0 | 0 | 100 |
| | Polyurethane 3 | 100 | 100 | 0 |
| Isocyanate mixture (pbw) | | 20 | — | — |
| Polyisocyanate compound (pbw) | | — | — | 9 |
| Thermoplastic elastomer (pbw) | | — | — | 15 |
| Titanium oxide (pbw) | | 3.5 | 3.5 | 3.5 |
| Ultramarine blue (pbw) | | 0.4 | 0.4 | 0.4 |
| Polyethylene wax (pbw) | | 1.5 | 1.5 | 1.5 |
| Montan wax (pbw) | | 0.8 | 0.8 | 0.8 |
| MFR (at 210° C.) | | 2.2* | 1.8 | 8.0 |
| Cover properties | Surface hardness (D hardness) | 61 | 59 | 60 |
| | Rebound resilience (%) | 45 | 44 | 52 |

TABLE 2-continued

|  |  | Comparative Example | | |
|---|---|---|---|---|
|  |  | 1 | 2 | 3 |
| Post-treatment | 50° C. warm water (18 hours) | no | no | yes |
| Ball properties | Diameter (mm) | 42.7 | 42.7 | 42.7 |
|  | Weight (g) | 45.7 | 45.7 | 45.6 |
|  | Defection (mm) | 2.3 | 2.4 | 2.3 |
|  | Initial velocity (m/s) | 77.1 | 77.0 | 76.8 |
|  | Scuff resistance 23° C. | 4 | 2 | 5 |
|  | 13° C. | 4 | 2 | 5 |
|  | 0° C. | 3 | 1 | 4 |
| Manufacturability |  | NG | good | good |

*This is a reference value; the cover material prepared was a mixture of different types of pellets.

Polyurethane 1 (Thermoplastic Polyurethane Material)
   Pandex T8295, produced by DIC Bayer Polymer, Ltd.
Polyurethane 2 (Thermoplastic Polyurethane Material)
   Pandex T8295 and Pandex T8290 were used in a weight ratio of 75/25. Both are products of DIC Bayer Polymer, Ltd.
Polyurethane 3 (Thermoplastic Polyurethane Material)
   Pandex T8260 and Pandex T8295 were used in a weight ratio of 50/50. Both are products of DIC Bayer Polymer, Ltd.
Explanation of Pandex T8295: A MDI-PTMG-type thermoplastic polyurethane material having a resin hardness of JIS-A97 and a rebound resilience of 44%.
Explanation of Pandex T8290: A MDI-PTMG-type thermoplastic polyurethane material having a resin hardness of JIS-A93 and a rebound resilience of 52%.
Explanation of Pandex T8260: A MDI-PTMG-type thermoplastic polyurethane material having a Durometer D resin hardness of 56 and a rebound resilience of 45%.
Isocyanate Mixture
   Crossnate EM-30 (an isocyanate masterbatch produced by Dainichiseika Color & Chemicals Mfg. Co., Ltd.; 4,4'-diphenylmethane diisocyanate content, 30%; the masterbatch base resin was a polyester elastomer).
Polyisocyanate Compound
   4,4'-Diphenylmethane diisocyanate
Polyethylene Wax
   Sanwax 161P, produced by Sanyo Chemical Industries, Ltd.
Montan Wax
   Licowax E, produced by (Clariant Japan) K.K.
Thermoplastic Elastomer
   A thermoplastic polyetherester elastomer (Hytrel 4001, produced by DuPont-Toray Co., Ltd.) was used.
Melt Mass Flow Rate (MFR)
   The melt flow rate (or melt index) of the material was measured in accordance with JIS-K7210 (test temperature, 210° C.; test load, 21 N (2.16 kgf)).
Surface Hardness of Cover Layer
   The Durometer D hardness was measured in accordance with JIS-K7215.
Rebound Resilience of Cover Material
   The rebound resilience was measured in accordance with JIS-K7311.
Ball Deformation (mm)
   The deflection when compressed under a load of 980 N (100 kg) was measured.

Ball Initial Velocity (m/s)
   Measured in accordance with the measurement method of the USGA (R&A).
Scuff Resistance of Ball
   The ball was held at respective temperatures of 23° C., 13° C. and 0° C. Using a swing robot machine, each ball was hit, using a pitching wedge as the club, at a head speed of 33 m/s, after which damage from the impact was visually rated according to the following criteria.
   5: No damage whatsoever or substantially free of apparent damage.
   4: Slight damage is apparent, but of minimal concern.
   3: Surface is somewhat frayed.
   2: Surface is frayed and damaged dimples are apparent.
   1: Some dimples are completely obliterated.
Ball Manufacturability
   Good: Molding conditions during mass production were stable; problems such as scorching of resin were infrequent.
   NG: Molding conditions during mass production were unstable; high frequency of problems such as resin scorching.

The invention claimed is:

1. A method of manufacturing golf balls which is characterized in that a golf ball having a cover layer formed thereon is post-treated for a specific length of time in up to a 150° C. temperature environment and/or a high-humidity environment,
   wherein the method comprises the steps of premixing a cover resin material comprising (A) a thermoplastic polyurethane, (B) a polyisocyanate compound and (C) a thermoplastic elastomer other than the thermoplastic polyurethane in a weight ratio (A):(B):(C)=100: {2-50}: {0-50} to form single pellets; and injecting the cover resin material in the form of the single resin pellets so as to form a cover layer,
   wherein the cover resin material is injected with from 10 to 99% of the total number of isocyanate groups in component B remaining in an unreacted state within the cover resin material.

2. The golf ball manufacturing method of claim 1, wherein the treatment environment is selected from one of (i) to (iv) below:
   (i) under a heat source of up to 120° C.,
   (ii) in a constant-temperature, constant-humidity chamber at a relative humidity of at least 50% but not more than 80%,
   (iii) in hot water at a temperature of not above 80° C.,
   (iv) in water at a temperature of not above 25° C.

3. The golf ball manufacturing method of claim 2, wherein the treatment time does not exceed 5 hours.

4. The golf ball manufacturing method of claim 1, further comprising the step of cooling the cover resin material in an environment isolated from moisture and pelletizing them so as to form single pellets in an incompletely reacted state.

5. The golf ball manufacturing method of claim 1, wherein the cover resin material comprising component A, component B and component C is premixed in a weight ratio (A):(B):(C) =100:{2-50}:{0-50} under an inert gas atmosphere.

* * * * *